US011687826B2

(12) United States Patent
Kummamuru et al.

(10) Patent No.: US 11,687,826 B2
(45) Date of Patent: Jun. 27, 2023

(54) ARTIFICIAL INTELLIGENCE (AI) BASED INNOVATION DATA PROCESSING SYSTEM

(71) Applicant: ACCENTURE GLOBAL SOLUTIONS LIMITED, Dublin (IE)

(72) Inventors: Krishna Kummamuru, Bangalore (IN); Bibudh Lahiri, Noida (IN); Guruprasad Dasappa, Bangalore (IN); Arjun Atreya V, Bangalore (IN); Alexander Frederick John Piers Hall, Singapore (SG); Sven Ruytinx, Kuala Lumpur (MY); Cyrille Witjas, Singapore (SG)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 959 days.

(21) Appl. No.: 16/555,320

(22) Filed: Aug. 29, 2019

(65) Prior Publication Data

US 2021/0065045 A1     Mar. 4, 2021

(51) Int. Cl.
*G06F 17/00* (2019.01)
*G06N 20/00* (2019.01)
*G06N 5/02* (2023.01)
*G06F 16/9038* (2019.01)
*G06F 16/903* (2019.01)
*G06F 16/93* (2019.01)

(52) U.S. Cl.
CPC ......... *G06N 20/00* (2019.01); *G06F 16/9038* (2019.01); *G06F 16/90335* (2019.01); *G06F 16/93* (2019.01); *G06N 5/02* (2013.01)

(58) Field of Classification Search
CPC .... G06N 20/00; G06N 5/02; G06F 16/90335; G06F 16/9038; G06F 16/93

USPC ..................................................... 706/11, 20
See application file for complete search history.

(56) References Cited

U.S. PATENT DOCUMENTS

| 10,303,999 | B2* | 5/2019 | Hertz | G06K 9/6259 |
|---|---|---|---|---|
| 10,678,835 | B2* | 6/2020 | Saha | G06N 5/022 |
| 10,938,817 | B2* | 3/2021 | Han | G06N 5/022 |
| 10,949,613 | B2* | 3/2021 | Freed | G06N 5/022 |

(Continued)

OTHER PUBLICATIONS

Betina, 'Content-based Information Retrieval by Named Entity Recognition and Verb Semantic Role Labelling', Journal of Universal Computer Science, vol. 21, No. 13, 2015 (Year: 2015).*

*Primary Examiner* — Stephen S Hong
*Assistant Examiner* — Matthew J Ludwig
(74) *Attorney, Agent, or Firm* — Mannava & Kang, P.C.

(57) ABSTRACT

An Artificial Intelligence (AI)-based innovation data processing system receives at least one query word related to a category. Information material including textual and non-textual data is retrieved from a plurality of data sources using the at least one query word. The information material is tokenized and parsed using a dependency parser for entity recognition, building entity relationships and for generating knowledge graphs. The output of the dependency parser is accessed by a trained classifier for obtaining respective confidence levels for each of the sentences in the textual data. The confidence levels are compared to a predetermined threshold confidence level for determining if the sentences include references to innovations. In addition, trends in the innovations are determined and responses to user queries are generated based on one or more of knowledge graphs and the trends.

20 Claims, 13 Drawing Sheets

(56) References Cited

U.S. PATENT DOCUMENTS

| | | | |
|---|---|---|---|
| 11,138,378 B2* | 10/2021 | Norton | G06N 3/04 |
| 11,250,038 B2* | 2/2022 | Bajaj | G06N 3/0454 |
| 11,403,301 B2* | 8/2022 | Zhou | G06F 16/951 |
| 2006/0117252 A1* | 6/2006 | Du | G06F 16/36 |
| | | | 715/255 |
| 2011/0282878 A1* | 11/2011 | Bird | G06F 16/374 |
| | | | 707/E17.014 |
| 2013/0174074 A1* | 7/2013 | Strzygowski | G06Q 50/01 |
| | | | 715/771 |
| 2017/0235848 A1* | 8/2017 | Van Dusen | G06N 5/02 |
| | | | 705/12 |
| 2019/0057310 A1 | 2/2019 | Olmstead et al. | |
| 2020/0074310 A1* | 3/2020 | Li | G06F 40/30 |
| 2020/0250249 A1* | 8/2020 | Fedoryszak | G06F 16/906 |

\* cited by examiner

HTTPS://WWW.RIGZONE.COM/NEWS/GE_TO_PURSUE_ORDERLY_SEPARATION_FROM_BHGE-26-JUN-2018-156070-ARTICLE/

GE PLANS TO PURSUE AN ORDERLY SEPARATION FROM BHGE OVER THE NEXT TWO TO THREE YEARS.

GE ANNOUNCED TUESDAY THAT IT PLANS TO PURSUE AN "ORDERLY SEPARATION FROM BHGE OVER THE NEXT "TWO TO THREE YEARS".

THE COMPANY SAID IT INTENDS TO "FULLY SEPARATE" ITS 62.5 PERCENT INTEREST IN BHGE "IN AN ORDERLY MANNER" OVER THE TIMEFRAME, IN A MOVE WHICH IT SAYS "WILL PROVIDE BHGE WITH ENHANCED AGILITY AND THE ABILITY TO FOCUS ON LEADING IN THE OIL AND GAS INDUSTRY".

THE ANNOUNCEMENT FOLLOWS A STRATEGIC REVIEW BY GE, WHICH RESULTED IN THE COMPANY WHITTLING DOWN ITS FOCUS TO THE AVIATION, POWER AND RENEWABLE ENERGY INDUSTRIES. IN ADDITION TO REVEALING ITS PLANS TO SEPARATE FROM BHGE, GE SAID TUESDAY THAT IT ALSO PLANS TO SEPARATE GE HEALTHCARE INTO A STANDALONE COMPANY.

TODAY MARKS AN IMPORTANT MILESTONE IN GE'S HISTORY. WE ARE AGGRESSIVELY DRIVING FORWARD AS AN AVIATION, POWER AND RENEWABLE ENERGY COMPANY; THREE HIGHLY COMPLEMENTARY BUSINESSES POISED FOR FUTURE GROWTH. WE WILL CONTINUE TO IMPROVE OUR OPERATIONS AND BALANCE SHEET AS WE MAKE GE SIMPLER AND STRONGER," JOHN FLANNERY, CHAIRMAN AND CEO OF GE, SAID IN A COMPANY STATEMENT.

*FIG. 7A*

[GE ORG] ANNOUNCED TUESDAY THAT IT PLANS TO PURSUE AN "ORDERLY SEPARATION" FROM [BHGE ORG] OVER THE NEXT "TWO TO THREE YEARS".

THE COMPANY SAID IT INTENDS TO "FULLY SEPARATE" ITS 62.5 PERCENT INTEREST IN [BHGE ORG] "IN AN ORDERLY MANNER" OVER THE TIMEFRAME, IN A MOVE WHICH IT SAYS "WILL PROVIDE BHGE WITH ENHANCED AGILITY AND THE ABILITY TO FOCUS ON LEADING IN THE OIL AND GAS INDUSTRY".

THE ANNOUNCEMENT FOLLOWS A STRATEGIC REVIEW BY [GE ORG], WHICH RESULTED IN THE COMPANY WHITTLING DOWN ITS FOCUS TO THE AVIATION, POWER AND RENEWABLE ENERGY INDUSTRIES. IN ADDITION TO REVEALING IT'S PLANS TO SEPARATE FROM [BHGE ORG], [GE ORG] SAID TUESDAY THAT IT ALSO PLANS TO SEPARATE [GE HEALTHCARE ORG] INTO A STANDALONE COMPANY.

"TODAY MARKS AN IMPORTANT MILESTONE IN [GE ORG]'S HISTORY. WE ARE AGGRESSIVELY DRIVING FORWARD AS AN AVIATION, POWER AND RENEWABLE ENERGY COMPANY; THREE HIGHLY COMPLEMENTARY BUSINESSES POISED FOR FUTURE GROWTH. WE WILL CONTINUE TO IMPROVE OUR OPERATIONS AND BALANCE SHEET AS WE MAKE [GE ORG] SIMPLER AND STRONGER," [JOHN FLANNERY PERSON], CHAIRMAN AND CEO OF [GE ORG], SAID IN A COMPANY STATEMENT.

*FIG. 7B*

ARTIFICIAL INTELLIGENCE (AI) BASED INNOVATION DATA PROCESSING SYSTEM

BACKGROUND

Data processing is generally the retrieval and manipulation of data to gather relevant information. In this age of ubiquitous presence of computing-communication devices, many operations can be classified as data processing tasks. With the availability of innumerable data sources, gathering of relevant data and deriving meaningful information from the relevant data has become a vital task. Moreover, various types of online and offline data sources in different formats need to be accessed. Furthermore, the data from individual data sources when analyzed separately may fail to convey accurate results.

BRIEF DESCRIPTION OF DRAWINGS

Features of the present disclosure are illustrated by way of examples shown in the following figures. In the following figures, like numerals indicate like elements, in which:

FIGS. 7A, 7B and 7C show examples of analysis of a body of text for entity-relationship processing in accordance with some examples disclosed herein.

DETAILED DESCRIPTION

Figure 1:
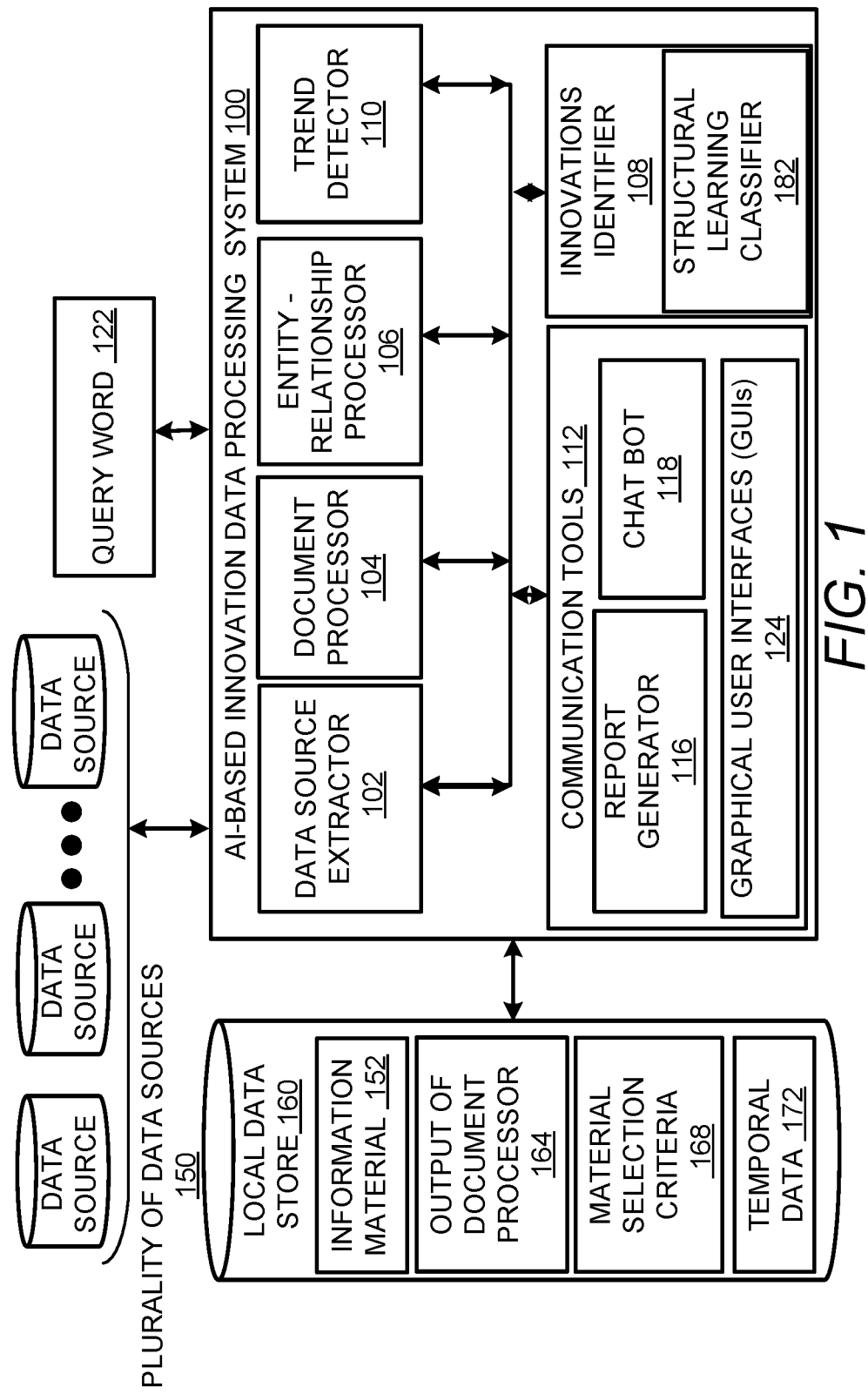
FIG. 1 is a block diagram that shows the AI-based innovation data processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An Artificial Intelligence (AI)-based innovation data processing system is disclosed. The innovation data processing system is configured to identify and track data related to predefined subject matter, such as innovations in particular fields or categories from a plurality of data sources, through natural language processing and artificial intelligence. The innovation data processing system receives at least one query word related to a category in which a user seeks to identify the predefined subject matter, which may be related to innovations. Predefined subject matter related to innovations can be subject matter qualified with specific adjectives or other category-specific terminology as outlined herein. The innovations can pertain to particular products, services, processes, standards or other tools used to execute functions in a given category which are considered as one or more of new and improved within the category. The innovations can also pertain to concepts or proposals for prospective or future products, services, processes, standards or other tools in the category which have not yet materialized e.g., built or tested. Rather, the concepts may only be theoretical without practical demonstration or the concepts may not yet exist in reality. The innovation data processing system uses the query word to execute searches on the plurality of data sources and extract information material relevant to the query word and pertaining to the category. Data related to innovations can be identified based on certain terminology used to describe the innovations in the information material retrieved from the plurality of data sources. Terms such as but not limited to, new, improved, superior, surprising, latest, innovative, inventive, current, creative, ingenious, clever, original, synonyms of these words and combinations thereof can be used to qualify the predetermined subject matter which will be identified as pertaining to innovations within the category. For example, terminology or the words used to describe the innovations comprised of products or services can indicate that such products or services were unavailable or were rare or could only be obtained with great effort at the time of publication of the information material. The plurality of data sources can include public data sources such as websites or other data stores, including databases, which are accessible via general purpose or category-based search engines. The plurality of data sources can also include private data sources such as but not limited to, local data stores which are accessible to authorized users only and which may not be accessed via the search engines. The information material extracted from the data sources and searched according to the query word(s) can include documents, audio files, video files, presentations or other data files relevant to the query word(s).

Based at least on the types of data sources associated with the information material, various types of innovations can be identified by the innovation data processing system. The different types of innovations can include early stage innovations, development innovations and production innovations. If the information material includes only conference proceedings, research papers, news articles, and patent literature, such innovations can be classified as early-stage innovations. If the information material includes source code in public repositories like GitHub, live demonstration of prototypes or proofs of concept, technical reports, in addition to conference proceedings, research papers, news documents, and patent literature, such innovations can be classified by the innovation data processing system as development stage innovations. If the information material includes, in addition to the aforementioned materials, marketing literature, provider/supplier websites, product presentations, etc., indicating availability of the products on the market the innovation can be classified as a production-stage innovation.

Natural language processing is performed on textual data from the information material, such as via tokenizing and parts-of-speech tagging. Each of the categories in which the innovation data processing system is trained to identify innovations, can have certain category-specific entities to be identified. Accordingly, named entity recognition (NER) techniques can be implemented for identifying the category-specific entities from the textual data of the information material. The textual data can be further processed via selection of a portion of or the entire information material based on satisfaction of certain material selection criteria. In an example, the material selection criteria can pertain to documents or portions of the documents in the information material including synonyms, usages, possible benefits and suppliers associated with the innovations.

The selected portion of the information material that satisfies the requisite material selection criteria is further processed via a dependency parsing to generate output including parse trees that encode labeled syntactic dependencies between the words in sentences of the selected information material. The output of the dependency parsing is provided to a classifier trained to identify the sentences that include references to innovations within the given category. In an example, the classifier can include convolutional neural network (CNN), Maximum Entropy (ME) or Support Vector Machine (SVM) models that can be trained via supervised training techniques in identifying references to innovative products/services in the textual data. For example, labelled training data including documents, websites or other literature including specific references to innovative or new products, services, processes, standards or other tools in the category which have been tested and implemented or which are yet to be built or tested in the category can be used to train the classifier. The trained classifier can analyze the output of the dependency parsing for each of the sentences and estimate a confidence level that is indicative of the likelihood of the sentence including references to innovations. The confidence level can be compared to a predetermined threshold confidence level in order to determine presence of entities or presence of references to entities pertaining to the innovations in the sentence. In an example, knowledge graphs can be generated, which encode the entities and relationships between the entities as derived from named entity recognition techniques and the dependency parsing.

In addition, the innovation data processing system is also configured to track trends in the innovations through their various stages through different time periods using time series modelling. Accordingly, the innovation data processing system can be configured to generate plots of the temporal data associated with the information material versus the data or metadata of the information material. The innovation data processing system is configured to produce data regarding the innovations based on the information that is extracted from the information material and recorded in one or more of the knowledge graphs and the plots of various data/metadata of the information material and the temporal data. In an example, the innovation data processing system can include multiple communication interfaces using which, the information regarding the innovative products and/or services of the given category can be conveyed to users. One of the communication interfaces includes a reporting interface such as a report generator wherein various reports of the data extracted from the information material and/or the plots of the data/metadata of the information material versus temporal data is conveyed. Chat bots can form another communication interface that can be used for conveying the data from the information material to a user. While the report generator receives certain attributes such as the data requested by the user to produce a static document, the chat bot can be more interactive. The chat bot can receive queries from the user and determine if one or more of the knowledge graphs and the trend/plots of the various data/metadata are to be accessed for responding to the user in real-time during a single communication session.

The innovation data processing system as disclosed herein provides for a technical improvement in scouting for innovations within specific categories. Existing systems for researching innovations are slow and impose a linear, unwieldy process on the users who employ such systems to discover or research category-specific innovations. It further requires users to scout for various conference proceedings or exhibitions, review reports, follow news sites, commission studies or maintain subscriptions. Users also need to thoroughly review these various data sources and synchronize the information therein to arrive at meaningful insights. The innovation data processing system as described herein automatically gathers information material, such as documents from different sources, analyzes the documents to provide summarized information and insights by correlating the information from the different sources. More particularly, the innovation data processing system is configured to coordinate the information from the knowledge graphs and the plots generated via the time series models to generate reports offline or to provide real-time responses to specific user queries. In processes such as fabrication of facilities which involve massive efforts with large expenditure, even incremental innovations or improvements can lead to greater efficiency that can translate into large savings.

FIG. 1 is a block diagram that shows the AI-based innovation data processing system 100 in accordance with the examples disclosed herein. The innovation data processing system 100 receives query word 122 related to a category description, and proceeds to automatically discover the innovations within that category using the query word 122 as a search query. The query word 122 can include one or a plurality of query words that pertain to the category. A user who provides the query word 122 for the query can limit the types of innovations to be retrieved via providing the necessary attributes as part of the query. For example, a query related to discovering innovations in drilling machines in the oil and gas sector or category can frame a query as "oil and gas, drilling machines, deep sea drilling". Similarly, a query related to innovations in packaging may be framed as "packaging, biodegradable, food grade", etc. In addition, the user may provide any specific data sources to be used for the search in place of or in addition to a search engine designed to search the Internet. In addition, the user can optionally provide certain category specific additional query words, such as names of products or services in the category such as trademarks or tradenames, the names of organizations associated with the innovations in the category, possible benefits that the user expects from the innovations, etc. If, in an example, when certain query words are associated with multiple categories, the innovation data processing system 100 may require the user providing the query word 122 to select one of the multiple categories and the additional query words or category-specific terms associated with the user-selected category can be automatically assigned and used for various functions including searching the plurality of data sources 150 and processing the data retrieved therefrom.

The innovation data processing system 100 includes a data source extractor 102 which employs the query word 122 to search a plurality of data sources 150 to extract information material 152 which may be stored in local data store 160. The information material 152 is processed by the innovation data processing system 100 in accordance with the example procedures disclosed herein. Various categories can be thus researched such as but not limited to, industrial categories, financial categories, healthcare categories, etc. By way of illustration and not limitation, examples pertaining to an industrial category of oil and gas will be discussed herein but it can be appreciated that the aspects of the innovation data processing system 100 can be equally applied to research and discover innovations in any category. The plurality of data sources 150 can be accessed for example, by search engines which can be used to identify documents from innovation entities such as manufacturers, suppliers, universities, information publishers, websites of the manufacturers, suppliers or portals of industrial associations and groups, social media material etc. Different kinds of documents such as presentations, paper publications for technical journals, advertisements, white papers, social media messages etc., which include data in various formats such as but not limited to, textual data, graphical data, audio/video data, etc. For audio/video data, the tags or comments associated with the data or the transcripts if available, can be retrieved. The data source extractor 102 can be configured to download the information material 152 associated with the query word 122 to a local data store 160.

Various stages of innovations can be identified/discovered based on the types of data sources 150 and the information material. Information for early stage innovations which are still being developed in the laboratories can be obtained for example, from, conference proceedings, news documents or research publications. Similarly, innovations can include those in the development stage for which prototypes may be available for testing. Information for the development stage innovations can also be obtained from documents such as conference proceedings, research papers or news documents. Another class of innovations can include those innovations which are fully developed and are available in the market. Information regarding such fully-developed innovations can be obtained from conference proceedings, news documents, research papers, as well as literature related to the products, services, processes, standards or other tools used in conducting processes in the category that have incorporated such innovations. For example, advertisements or other marketing and technical literature from the providers of the innovations, etc., can include the information regarding the fully developed innovations.

A document processor 104 included in the innovation data processing system 100 processes the information material 152 to extract the information required for the discovery of the innovation. In an example, the document processor 104 can enable structural learning wherein innovations in the category are automatically identified using contextual features in a supervised learning framework. In addition, the information extracted using the document processor 104 enables to track trends in the innovations of the category through time. The document processor 104 therefore parses, tokenizes and identifies the parts of speech (POS) of the tokens via implementing dependency parsing. The tokens are therefore tagged with the corresponding POS tags. Moreover, the temporal data associated with the documents is also extracted. The information thus extracted can be stored in the local data store 160 at the output 164 of the document processor 104 for further processing by other elements of the innovation data processing system 100.

The innovation data processing system 100 also includes an entity-relationship processor 106 which identifies entities associated with the category and the query word 122 from the output of the document processor 104. In addition, the entity-relationship processor 106 determines the relationships between the entities from the output 164 to build one or more knowledge graphs which encode the entities and the relationships therebetween. One of the entities extracted by the entity-relationship processor 106 can include temporal data 172 which pertains to the dates and/or times associated with the information material 152. For example, the material selection criteria 168 can be used for selecting particular documents from the information material 152 and for further selecting paragraphs and sentences from the particular selected documents for entity-relationship extraction. Various techniques such as detailed infra can be used for the entity relationship extraction.

The entities and the entity relationships extracted from the information material 152 are employed by an innovation identifier 108 for identifying innovations in the category. More particularly, the innovation identifier 108 can be employed to identify nouns including proper nouns or common nouns corresponding to emerging or popular improvements employed for carrying out the tasks pertaining to that category. Generally, identification of words pertaining to the innovations is based on the context of occurrences of the words. The innovations identifier 108 further includes a structural learning classifier 182 which is trained to identify sentence structures, patterns of words in sentences or phrases that are indicative of innovations. Referring to the oil and gas category example, the innovations discovered by the innovations identifier 108 from the information material can include commonly used tools, trademarks, tradenames, category-specific jargon pertaining to new hardware or machinery, software, new processes, chemicals, new protocols or other tools used to execute the tasks associated with the oil and gas industry. In certain examples, the innovation identifier 108 is configured to produce data in conjunction with a trend detector 110 which is also included in the innovation data processing system 100. For example, the innovation data processing system 100 can allow a user to set a date range within which one or more of the specific types of innovations are to be identified.

The temporal data 172 extracted by the entity-relationship processor 106 is used by a trend detector 110 to detect trends using time series modelling. As mentioned above, in conjunction with the trend detector 110, the innovation identifier 108 is enabled to identify the maturity levels associated with each of the innovations processed by the innovation data processing system 100. The trend detector 110 enables tracking the progress occurring with adapting the innovation over a period of time. The trend detector 110 can detect trends which include the number of occurrences or references to a noun associated with the innovation in the information material in a given time period. The trends can also include the change in the number of references to the innovation over different time periods. The innovation identifier 108 in conjunction with the data from the trend detector 110 allows certain observations based on the timing trends and the types of data sources. For example, if references to an innovation are detected over a long time period in conference proceedings and research documents but have dropped thereafter and no further references are detected, then the innovation data processing system 100 can identify the innovation as not having been developed or adapted to production. Similarly, other innovations which are still in progress or where progress has stalled can be identified to the user by the innovation data processing system 100.

The information or data collected by the innovation data processing system 100 regarding the innovations can be conveyed via different communication tools 112. One of communication tools 112 includes a report generator 116 while other communication tools can include chat bots 118. The report generator 116 can be used to generate various reports regarding innovations which include data summarized from the information material 152 obtained from the plurality of data sources 150. In some examples, the reports generated can be based on various attributes of one innovation. In other examples, the reports can be generated based on other attributes e.g., report of innovations from a particular supplier, or from a particular time period, or a specific category/time combination etc.

The chat bot 118 is another communication tool that can be implemented by the innovation data processing system 100. The chat bot 118 can be implemented as an online messenger tool that is configured to handle user queries regarding the innovations in real-time. The user queries can be conveyed as a series of keywords or may be natural language based user queries. If based on natural language, the user queries can be initially processed via parsing, tokenization, POS tagging etc. in order to determine the information being sought by the user. The chat bot 118 can be configured to interact with knowledge graphs encoding the entity relationships in order to answer user queries. In an example, the chat bot 118 may access reports generated by the report generator 116 and provide links to the reports in the messenger interface if it is determined that the report provides the information being sought by the user. The communication tools 112 can be associated with various graphical user interfaces (124) that can be used to receive data such as the query word(s) 122 or provide output to a user such as responses to the queries, reports, etc.

Figure 2:
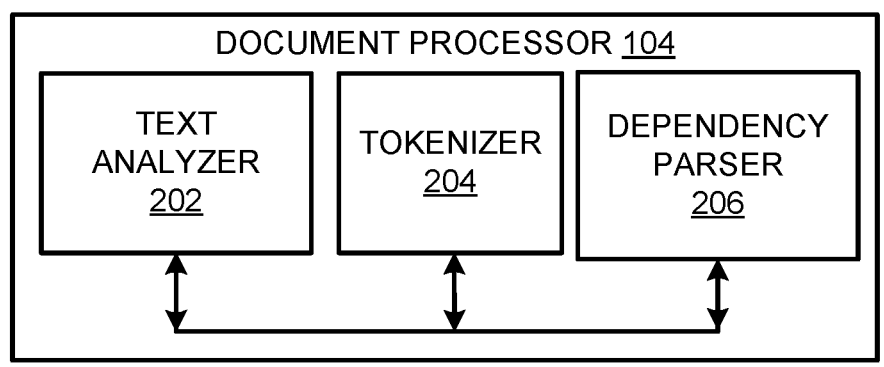
FIG. 2 shows the details of a document processor in accordance with the examples disclosed herein.

FIG. 2 shows the details of the document processor 104 in accordance with the examples disclosed herein. The document processor 104 includes a text analyzer 202, a tokenizer 204 and a dependency parser 206. The text analyzer 202 in conjunction with the tokenizer 204 can split a given sequence of characters or values (text) into smaller parts based on a given set of rules. The document processor 104 can implement simple file parsing in an example, as the information material 152 to be processed may include strings of characters. Different methodologies can be employed for parsing textual content in different contexts. For example, the text can be analyzed line-by-line using a programming tool, such as Python's native string methods, or using specialized pattern recognition language like regular expressions, etc., by the text analyzer 202. Where the given sequence is analyzed, the tokenizer 204 can output word tokens, punctuations, etc., for further processing.

The dependency parser 206 is configured to extract a dependency parse of a sentence that represents its grammatical structure and defines the relationships between "head" words and words that modify the head words. The output of dependency parsing can include assigning syntactic structures such as parse trees to sentences. A parser builds a parse by performing a linear-time scan over the words of a sentence and applying different types of transitions between words on a stack and those in a buffer. In an example, the dependency parser 206 can be powered by a neural network and tools such as spaCy dependency parser can be employed to provide token properties to navigate dependency parse trees that are generated for a body of text. After tokenization, spaCy can parse and tag a given document using a trained statistical model which is employed to make a prediction of which tag or label most likely applies to a given context. Accordingly, the output of the dependency parser 206 can include not only the dependencies between the head words and the modifiers of the head words but also POS tags for each of the word tokens generated by the tokenizer 204.

Figure 3:
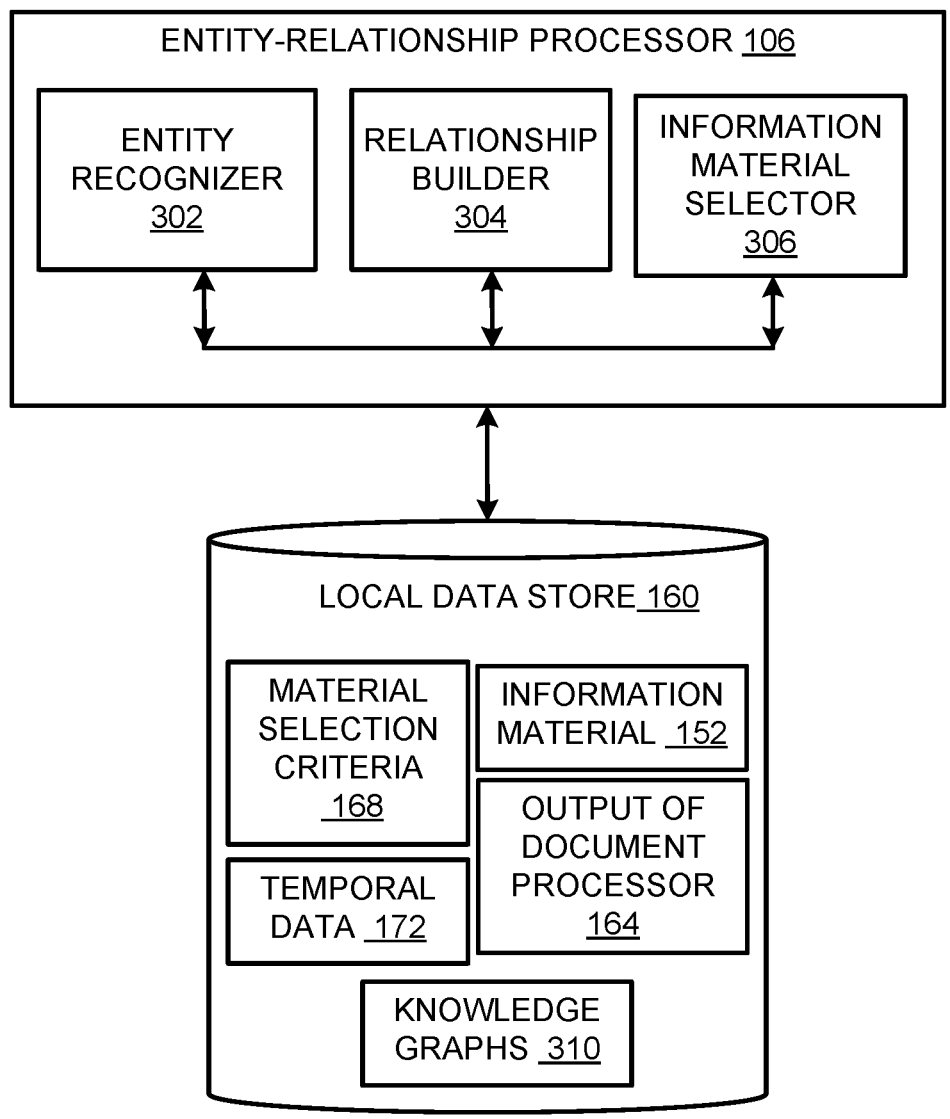
FIG. 3 shows a block diagram of an entity-relationship processor in accordance with the examples disclosed herein.

FIG. 3 shows a block diagram of the entity-relationship processor 106 in accordance with the examples disclosed herein. The entity-relationship processor 106 includes an entity recognizer 302, a relationship builder 304 and an information material selector 306 in accordance with the examples disclosed herein. The entity recognizer 302 identifies, from the output 164 of the document processor 104, various entities such as but not limited to, the names of products and/or services associated with the innovation(s), the possible benefits of the innovation(s), the organization(s) associated with the innovation and any temporal data such as dates which are extracted from the information material 152. The names of the innovations such as innovative products, services or other tools can be identified by the entity recognizer 302 from the nouns using the POS tags of the tokens in the output 164. Similarly, the organization(s) related to the innovations can include the universities or research organizations, the associations, forums or consortiums working on the innovations, the suppliers providing the innovations. The organizations can also be recognized from word tokens tagged as proper nouns in the output 164. Named entity recognition (NER) techniques including tokenization, POS tagging and noun phrase chunking can be used to identify named entities using regular expressions which can include rules on how the sentences should be chunked. The output can include a tree or a hierarchy each with its POS tag and its named entity tag The various types of named entities can be recognized using a classifier which can be trained to add category labels for the names of the products/services, the people and the organizations, etc. Statistical methods for NER can include machine learning models such as Hidden Markov Model (HMM), Maximum Entropy (ME), Support Vector Machine (SVM), etc., trained explicitly using annotated corpus. Tools such as but not limited to SpaCy can be used in implementing the NER techniques. The possible benefits can be determined from tokens tagged as verbs, adverbs, or adjectives and those tokens with numerical data.

The relationship builder 304 analyzes the syntactical information from the output 164 generated by the dependency parser 206, e.g., the dependency parse trees, to determine the relationships between the various entities. The relationship builder 304 further enables entity resolution via implementing co-reference and anaphora resolution for identifying the synonyms and various references to the same entities within the information material 152. Various features of the documents in the information material 152 can be obtained by the relationship builder 304. The features can include but are not limited to, the data source from the plurality of data sources 150 from which the document was retrieved, the structure of the textual content in the documents, the frequency of occurrence of the various entities etc.

The information material selector 306 selects the documents and/or portions of the documents within the information material 152 based on certain material selection criteria 168. The material selection criteria 168 include presence of one or more of the synonyms of the innovations/usages of the innovations, possible benefits, the organizations associated with the innovations and the temporal entities. If the document or document portion(s) include at least two of the aforementioned material selection criteria i.e., the innovations or their synonyms, the organizations, the possible benefits and temporal entities, then the document portions or the entire document(s) can be selected for further processing. The portions of the document can include sentences and paragraphs in an example. If a paragraph and a sentence therein include at least one of the aforementioned material selection criteria, then the paragraph or the sentence is selected for further entity/relationship processing. In an example, the entity-relationship processor 106 can be configured to build one or more knowledge graphs 310 encoding the entities and the relationships between the entities that are derived from the information material 152.

Figure 4:
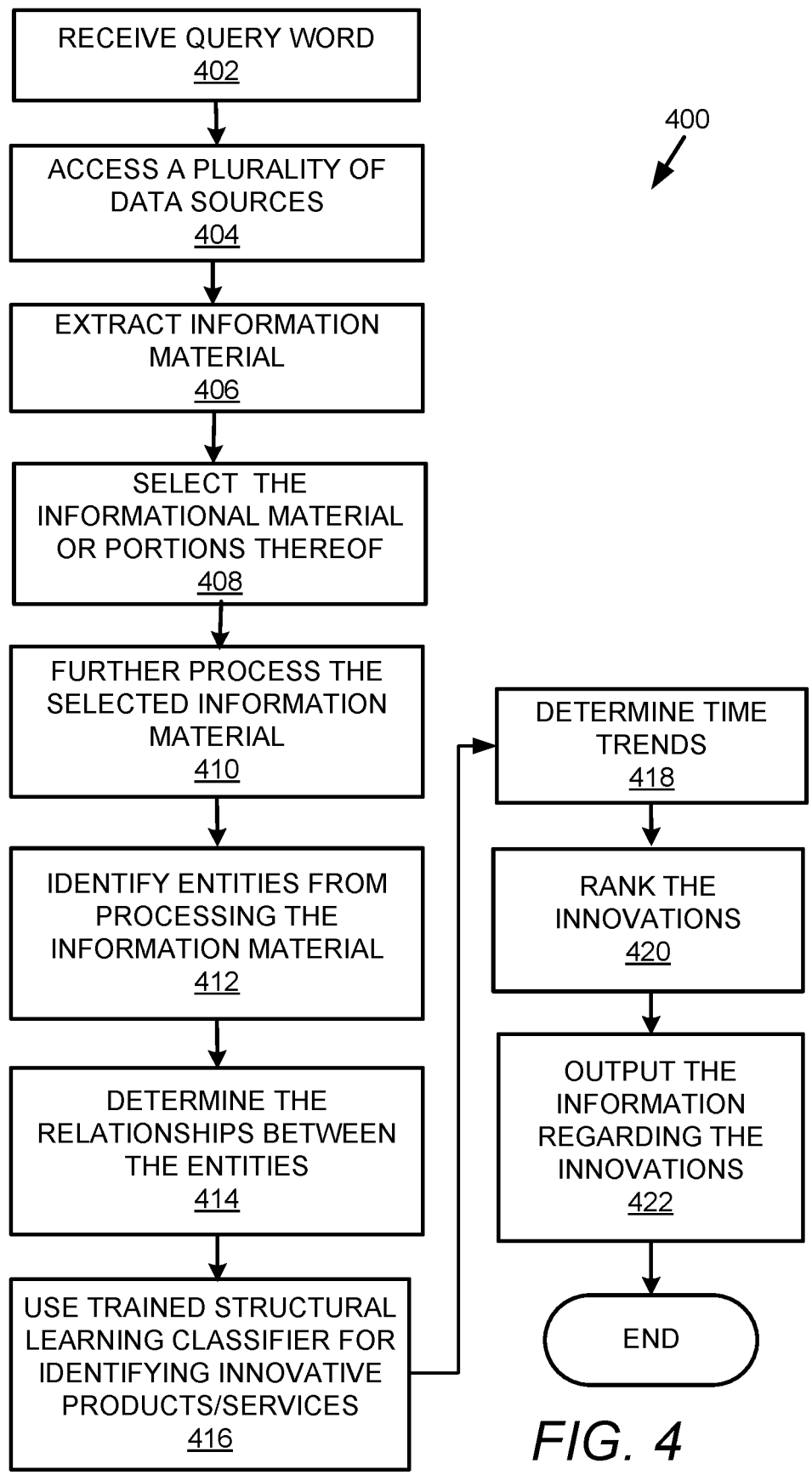
FIG. 4 shows a flowchart that details a method of identifying innovations in a given category in accordance with the examples disclosed herein.

FIG. 4 shows a flowchart 400 that details a method or process of identifying innovations in a given category in accordance with the examples disclosed herein. The method begins at 402 wherein the query word 122 related to a category are received. The query word 122 can include multiple query words and can be provided by a user via one of the GUIs 124. At 404, the query word(s) are used to search the plurality of data sources 150 which include public data sources such as publicly available websites and private data sources such as data stores which are local to the innovation data processing system 100 or subscription databases etc. The information material 152 relevant to the query word(s) 122 is extracted from the plurality of data sources 150 at 406. As mentioned herein, the information material 152 can include textual documents or textual data associated with audio/image files such as the image tags, comments, etc., which are further processed at 408 for selection of particular information material, e.g., particular ones of the textual documents or portions of the textual documents, such as but not limited to, paragraphs or sentences based on satisfaction of certain material selection criteria. In an example, the material selection criteria can pertain to the category specific keywords, synonyms thereof, possible benefits, the names or organizations associated with the innovations, the temporal data, etc. The selected information material is further processed at 410 via tokenization and dependency parsing wherein labeled syntactic dependencies are generated between words of each of the sentences in the textual data of the selected information material. Generation of labeled syntactic dependencies can include generating POS tags for words of a sentence based on how the words of a sentence are used to modify a head word of the sentence.

At 412, NER techniques can be employed to identify entities from the information material 152. The NER techniques can be used for identifying various entities which may not all be recognized as innovations in the final output of the innovation data processing system 100. The entities may all be identified as pertaining to potential innovations at 412 in that these entities are further processed to select those entities pertaining to the innovations in the category. Entities such as, the names of potential innovations or their synonyms, the people and organizations associated with research and development of the potential innovations, the geographical areas associated with the potential innovations such as the locations of their development and availability, etc., are identified at 412 in addition to the temporal data 172 associated with the information material 152. The temporal data 172 data extracted at 412 can not only include the dates of publication or availability of the textual documents or other information material but also the dates which may be mentioned in the information material and which is extracted from the information material. In an example, the entities discovered at 412 can include the quantities or attributes of products and/or processes, etc. that are enhanced by the innovations. The extent of improvements in the attribute in terms of cardinal values are also extracted at 412 via recognition of cardinal values or using regex, etc.

While the entities are extracted at 412, the relationships between the entities are determined at 414 based on the tags generated for the words during the dependency parsing. For example, knowledge graphs 310 encoding the names of the innovations, the people and organizations working on the innovations, the geographical locations that the people and organizations are located in, the categories and the geographical locations where the innovations are employed, etc., are encoded in the knowledge graphs 310. At 416, the trained structural learning classifier 182 identifies the entities pertaining to the innovations from the knowledge graphs 310 based on the contexts in which the noun forms or entities corresponding to the innovations occur within the sentence. Alternately, the structural learning classifier 182 identifies the names of the innovations from the sentences in the selected information material based on the words surrounding the nouns referring to the innovations in the sentence. At 418, the timing trends are determined from the temporal data 172 extracted from the information material 152. In an example, a plot of the dates of publication or otherwise the dates of public availability of the information material versus the information material can be obtained via time series modelling at 418. In an example, the frequency of occurrence of the entities pertaining to each of the innovations can be obtained within a given time period from the time series modelling. The entities (and thereby the innovations) can be ranked at 420 based on the frequencies. The innovations which are trending the most with the highest frequencies of occurrences can be obtained from the rankings. The type of innovations discovered from the information material 152 can also be determined at 420 by the innovation identifier 108 based on the types of information material as discussed supra. The information regarding the innovations gathered by the innovation data processing system 100 can be produced as output at 422 using different interfaces such as reports generated for example, using third party report generators or as responses to queries posed to chat bots etc. Different chat bot interfaces such as Dialogflow® from Google® can be used to interface with the knowledge graphs 310 to produce responses to user queries.

Figure 5:
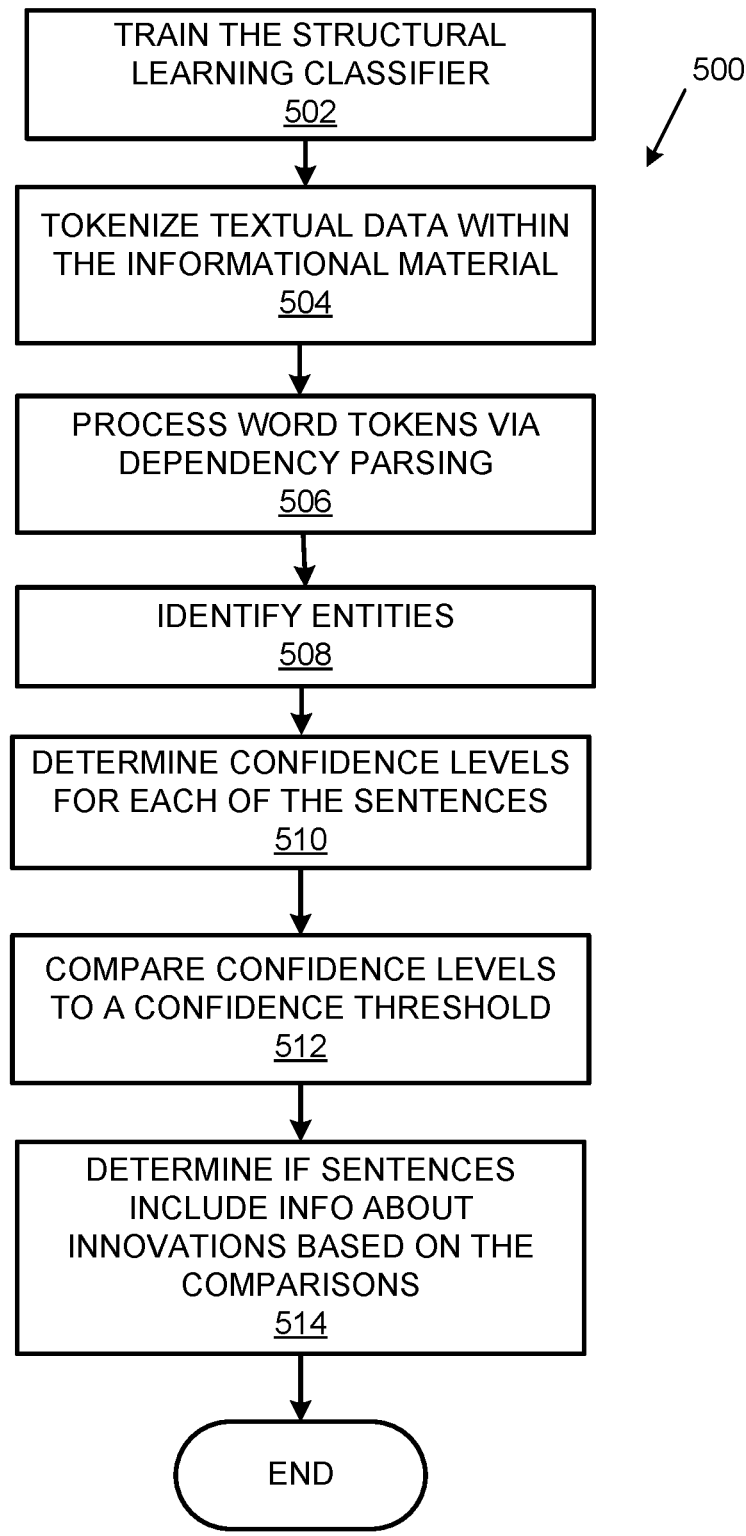
FIG. 5 shows a flowchart that details a method of processing the documents or textual data within the information material in accordance with the examples disclosed herein.

FIG. 5 shows a flowchart 500 that details a method of processing the documents or textual data within the information material in accordance with the examples disclosed herein. The method begins at 502 wherein a structural learning classifier 182 is initially trained to identify sentence structures or words/phrase formations that are indicative of presence of references to products/services or other innovations within the sentences. The structural learning classifier 182 can be trained using supervised learning techniques with labelled training data. The training data can include material for different categories that has been explicitly identified as containing data regarding the innovations and data explicitly labelled as not containing references to innovations. Accordingly, the structural learning classifier 182 can learn various sentence formations, synonyms, phrases and any category-specific jargon which refers to innovative or new innovations, etc. The training data can additionally include terms associated with the benefits or advantages of using the innovations. The benefits data can include descriptive data with terms associated with the benefits as well as synonyms of the terms associated with one or more of the products, services and benefits. In an example, the structural learning classifier 182 can be trained for identifying subsets of entities in the sentences corresponding to the innovations based on a set of heuristic queries associated with a given category. The structural learning classifier 182 can thus be trained based on a threshold level so that each of the sentences in a body of textual data can be classified as having references to innovations if the sentence has a respective confidence level higher than the threshold level.

At 504, the textual data or textual content within the information material is tokenized to create word or phrase tokens. The word tokens are processed via dependency parsing at 506. Accordingly, POS tags and parse trees detailing the sentence structures are generated corresponding to each of the word tokens based on the relationships of the words in the sentence with respect to a headword of the sentence. In addition, the entities are identified at 508 using NER techniques along with their inter-relationships as disclosed herein. At 510, the structures of each of the sentences as represented by a series of POS tokens output by the dependency parser 206 are analyzed by the structural learning classifier 182 to determine, a confidence level by the structural learning classifier 182 for the determination that data regarding the innovations is included in the sentences. In an example, comparative adjectives with noun phrases as adverbial modifiers can be identified within the output of the dependency parser 206. In addition, the structural learning classifier 182 can be trained in a specific category based on category-specific terminology for identifying the innovations, the objectives that are optimized by the innovations and how the objectives are optimized by the innovations in that category. Therefore, various categories can have different category-specific structural learning classifiers for analyzing information material and identifying innovations and/ or data relating to the innovations pertaining to that category from analyzed information material.

At 512, the confidence levels of the sentences is compared to a predetermined confidence threshold. In an example, the confidence threshold can be determined empirically for example, from the labelled training data. The sentences indicative of data regarding the innovations can be selected at 514 based on the comparisons of the confidence levels with the confidence threshold.

Figure 6:
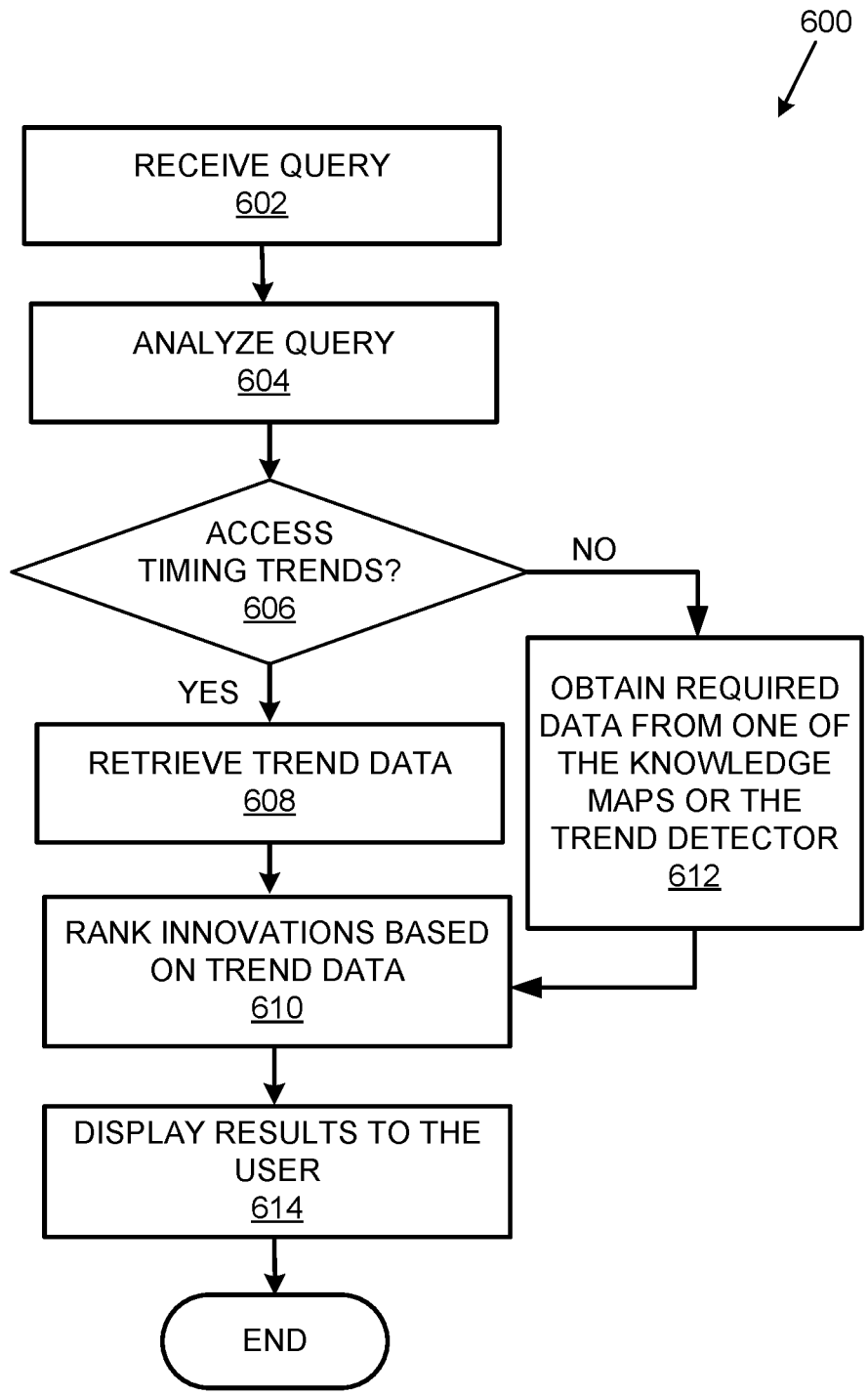
FIG. 6 shows a flowchart that details a method of producing responses to user queries regarding the innovations in accordance with the examples disclosed herein.

FIG. 6 shows a flowchart 600 that details a method of producing responses to user queries regarding the innovations based on the knowledge graphs 310 built in accordance with the examples disclosed herein. In an example, the queries can be received via the chat bot 118 which is included in the communication tools 112 of the innovation data processing system 100. The query which can include one or more keywords is initially received at 602. The query can be directed to retrieving information encoded within one or more of the knowledge graph 310 and the timing trends generated by the trend detector 110. The keywords in the query can be analyzed by the innovation identifier at 604 for the determination regarding accessing at least one of the knowledge graphs 310 and the timing trends generated by the trend detector 110. It is determined at 606 if the query necessitates access to the timing trends in addition to the knowledge graphs 310. If it is determined at 606 that the query necessitates access to the timing trends in addition to the knowledge graphs 310, the data from the timing trends generated by the trend detector 110 is retrieved at 608 and used to rank the list of innovations retrieved from the knowledge graphs 310 to produce a response to the query at 610. The timing trends can be used to filter the data from the knowledge graphs 310 via programming instructions in one example. The innovations thus identified from the information material can be ranked at 610 based on various criteria. By way of illustration and not limitation, the number of occurrences of the entities in a certain threshold time period immediately preceding the current date can be identified and the innovations can be ranked for example, based on trends in respective frequencies of occurrences. If the innovations are ranked in a descending order of a number of occurrences within the threshold time period, the innovations which are trending more within a given time period (which may be a time period immediately preceding a current time period or a time period otherwise set by a user) are ranked higher. Additional criteria such as but not limited to, certain grammatical features of the sentences including the entities corresponding to the innovations can be used with the number of occurrences to identify the innovations. For example, grammatical features including punctuation like exclamation marks, use of superlative adjectives etc. identified from the output of the dependency parser 206 can be used for the ranking. The output can be displayed to the user via the chat bot 118 at 616. If it is determined at 610 that only data from one of the knowledge graphs 310 or the trend detector 110 is required to respond to the query, the required data is obtained from one of the knowledge graphs 310 or the trend detector 110 at 612 and ranked at 614. The method returns to 616 to display the results and terminates on the end block. In an example, the output shown at 616 can include only a subset of the results generated in response to the query based on the rankings. Various queries such as but not limited to, the organization developing the technology, the objective the technology/product/service aims to optimize, how the objective is optimized and the extent to which the objective is optimized (quantitatively if possible), etc., queries can be posted on the chat bot 118 interface and information gathered as responses from the chat bot.

Figure 7C:
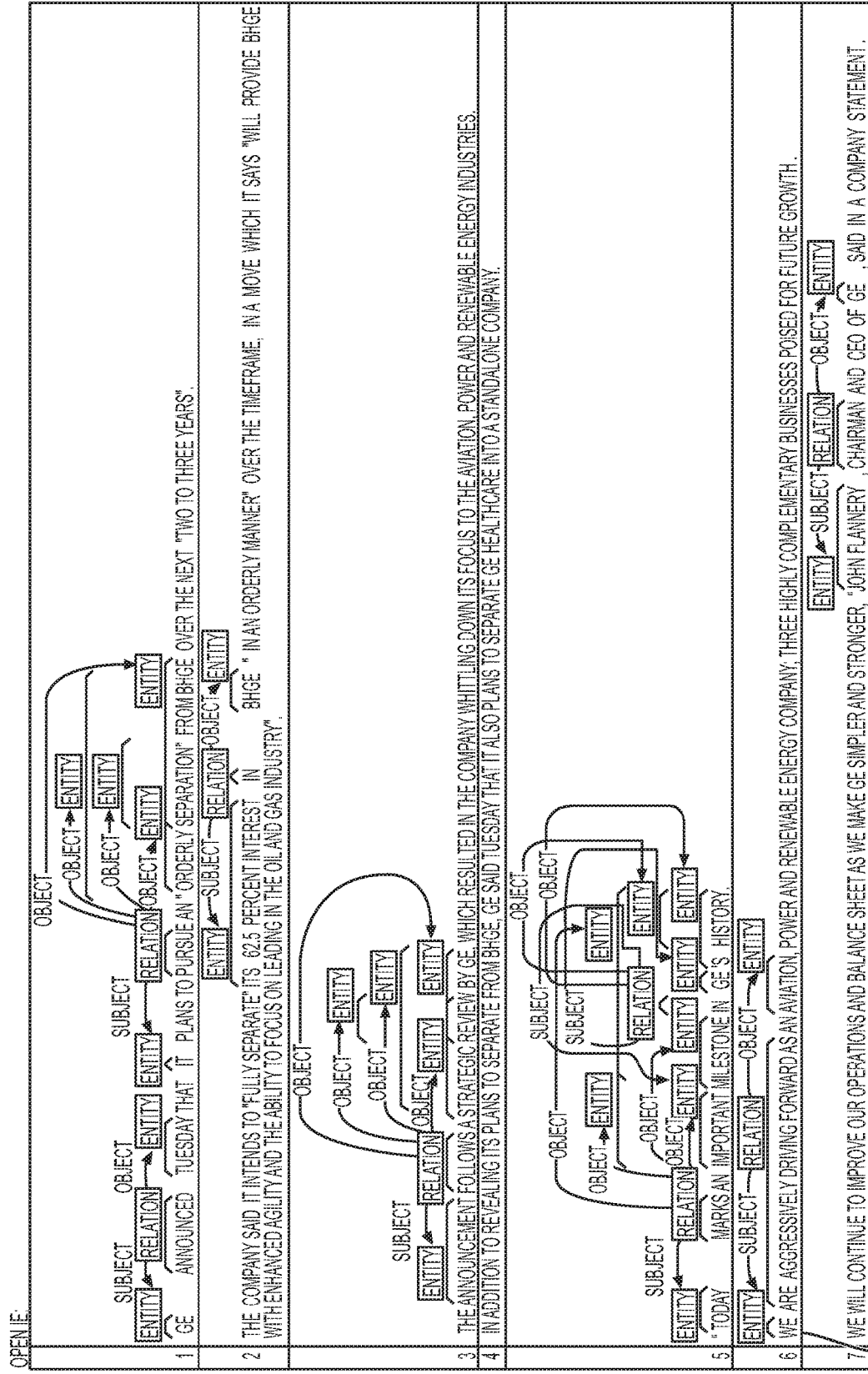

FIGS. 7A, 7B and 7C show examples of analysis of a body of text 702 for entity-relationship processing in accordance with some examples disclosed herein. Various tools such as but not limited to, SpaCy, Natural Language Tool Kit (NLTK), Stanford Core Natural Language Processing (NLP) can be used for implementing the NER techniques for entity recognition. As mentioned herein, when the query word 122 pertaining to the category is received, a plurality of entities associated with the category can be accessed and the innovation data processing system 100 can be configured to identify at least the plurality of entities within the body of text 702 shown in FIG. 7A. Of course, other entities not associated with the category or not included in the query word(s) can also be recognized based on the training. The entity-relationship processor 106, upon analyzing the body of text 702, can identify various entities such as BHGE, GE and GE Healthcare which are identified as organizations and John Flannery as a person based on the category as shown in 704 in FIG. 7B. Furthermore the relationships between the entities as derived by the entity-relationship processor is shown at 706 in FIG. 7C. For example, analysis of the sentence 710 in FIG. 7C identifies John Flannery as an entity and as a subject of the sentence, while another entity GE is identified as an object of the sentence with 'chairman' is identified as a relation between the subject John Flannery and object GE.

Figure 8:
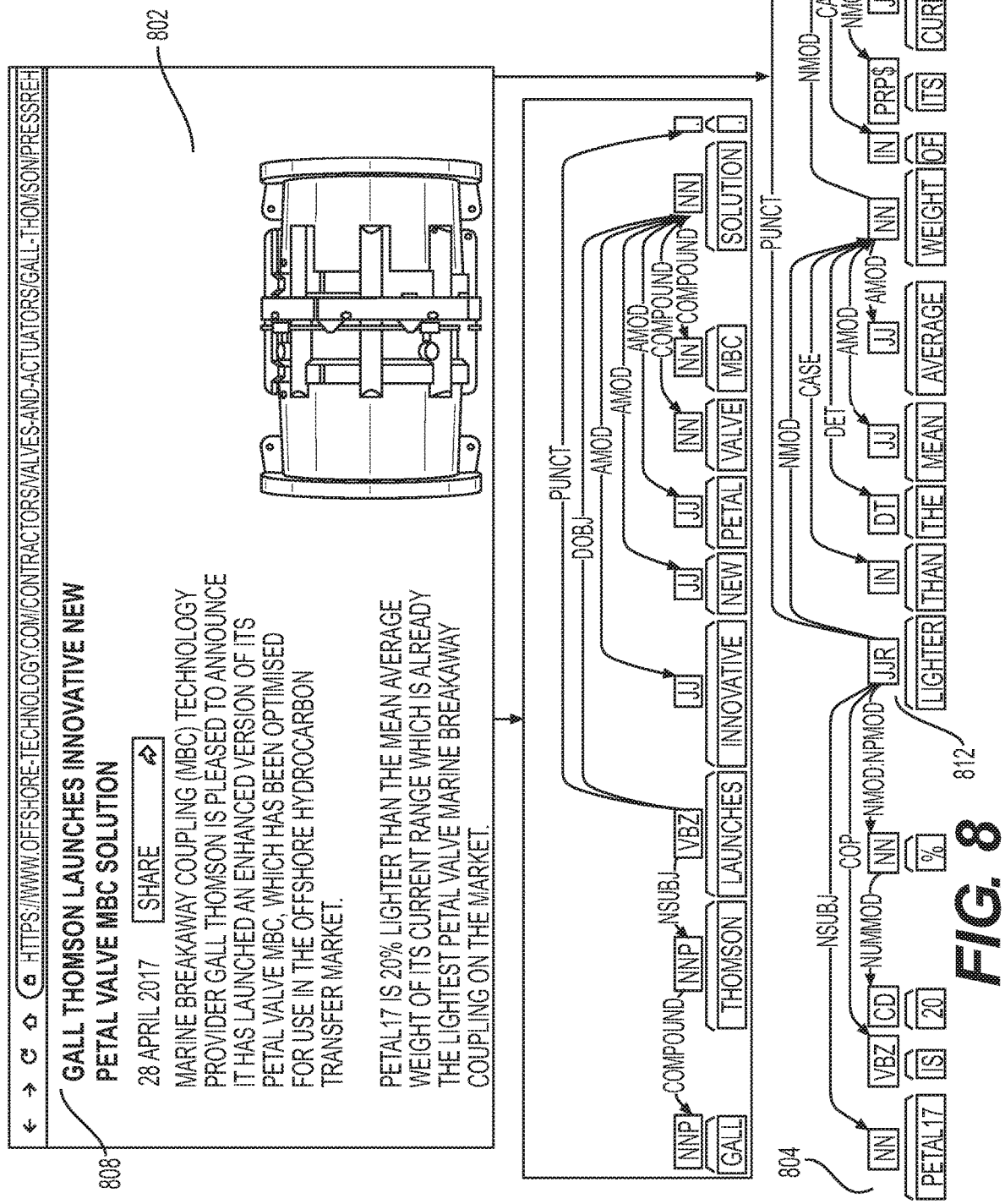
FIG. 8 shows an example output of the dependency parser in accordance with the examples disclosed herein.

FIG. 8 shows example outputs of the dependency parser 206 in accordance with the examples disclosed herein. The example outputs which can be viewed by a user interface associated with the dependency parser 206 show how the dependency parser 206 enables the data processing system 100 to identify the innovations in textual input, the objectives that the innovation aims to optimize and how the innovation optimizes that objective. The body of text 802 which can form a selected portion of the information material 152, upon entity and relationships identification, is further processed by the dependency parser 206. Each sentence is analyzed by the dependency parser 206 to produce tokens that represent relationships of each of the words in a sentence with a head word. In the example sentence 806, a head word 804 includes a noun 'Petal17' while the remaining words in the sentence are labelled as adjectives, nouns, prepositions, etc. based on their relationship with the head word 804. The analysis enables the innovation data processing system 100 to identify that 'Petal17' as a proper noun representing the name of an innovative product and the remainder of the sentence as describing an advantage of the 'Petal17' product in quantitative and qualitative terms that 'Petal17' is 20% lighter than the mean average weight of its current range.' The dependency parser 206 thus generates dependency parse trees for each sentence in the textual data of the information material 152. The arrow from the word 'lighter' to the word 'Petal 17' indicates that the word 'lighter' modifies the word 'Petal17' and the label 'nsubj' assigned to the arrow describes the nature of the dependency. Nodes corresponding to objectives that can be improved or indicating potential directions of optimization of the objectives such as the node 812 corresponding to the word 'lighter' can be thus identified from the output of the dependency parser 206 based on the direction of the arrows and the labels assigned to the arrows. The nodes can be identified based on NLP techniques including text matching and by using the POS tags from the dependency parser 206 which indicate the part of speech of the word e.g., 'lighter' and how the word 'lighter' modifies the head word 'Petal17'. Therefore, words indicating potential directions of optimization of the objectives are identified from the nodes. The information thus extracted via the dependency parsing can be provided to the user as responses to queries via the chat bot 118 or as reports via the report generator 116 in response to the relevant queries or to the relevant reporting requests from the users. Similarly, when the heading 808 of the body of text 802 is analyzed, two head words are nouns "Gall Thomson" and are modified by the remaining words which include a verb 'launches', adjectives 'innovative new petal' followed by more nouns 'valve MBC solution' in the heading 808. The data processing system 100 is explicitly trained to identify such POS token patterns from the dependency parser output and specific terminology which is indicative of the presence of an innovation in the particular sentence.

Figure 9A:
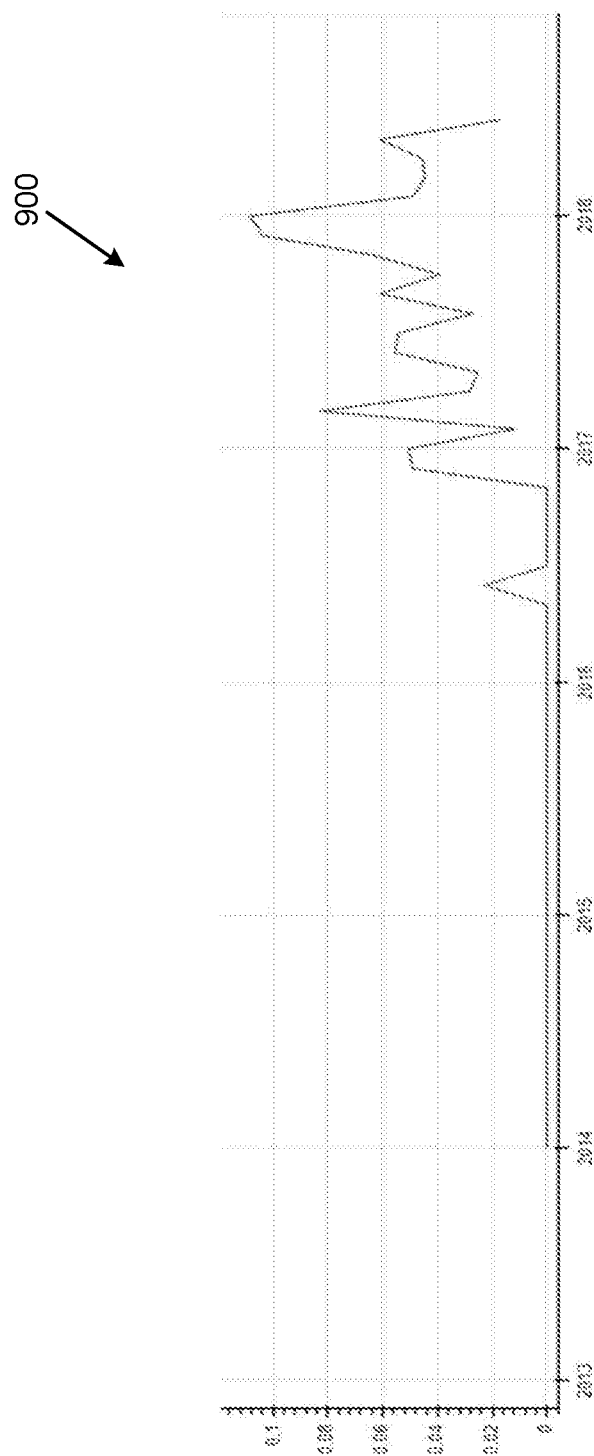
FIG. 9A shows a graph that can be generated by the innovation data processing system in accordance with the examples disclosed herein.

FIG. 9A shows a graph 900 that can be generated by the trend detector 110 to determine trends based on the temporal data 172 in accordance with the examples disclosed herein. As mentioned herein, the trend detector 110 can use time series models to plot the data and metadata of the information material 152 versus the temporal data associated with the information material. The data can include the actual information in the textual data extracted from the information material. The metadata can include but is not limited to, temporal data of the information material, the organization associated with the information material, the number of times a particular name of the innovative product/service occurs in the information material, the occurrence of specific grammatical features such as but not limited to, particular punctuation marks, use of superlatives, etc.

The graph 900 plots the trend in usage of the term 'blockchain' in the oil and gas new over a period spanning more than five years. It can be seen that while the occurrence of the term 'blockchain' began in 2014 in the oil and gas news, it remained fairly flat and low until mid-2016 when it spiked and progressively gained popularity from 2017 onwards. This can indicate the trend when 'blockchain' was an early stage innovation, and the time periods when blockchain progressed to a development stage innovation and reached the production stage. Various plots such as the graph 900 can be generated for the innovations discovered by the innovation data processing system 100 and early stage innovations can be identified for further study. Moreover, the plots such as the graph 900 enables studying the evolution or progress of the innovations with time. Although a single plot is shown in the graph 900, multiple innovations can be similarly plotted and comparisons can be generated. Such plots in conjunction with the knowledge graphs 310 can be used to answer user queries put to the innovation data processing system 100.

Figure 9B:
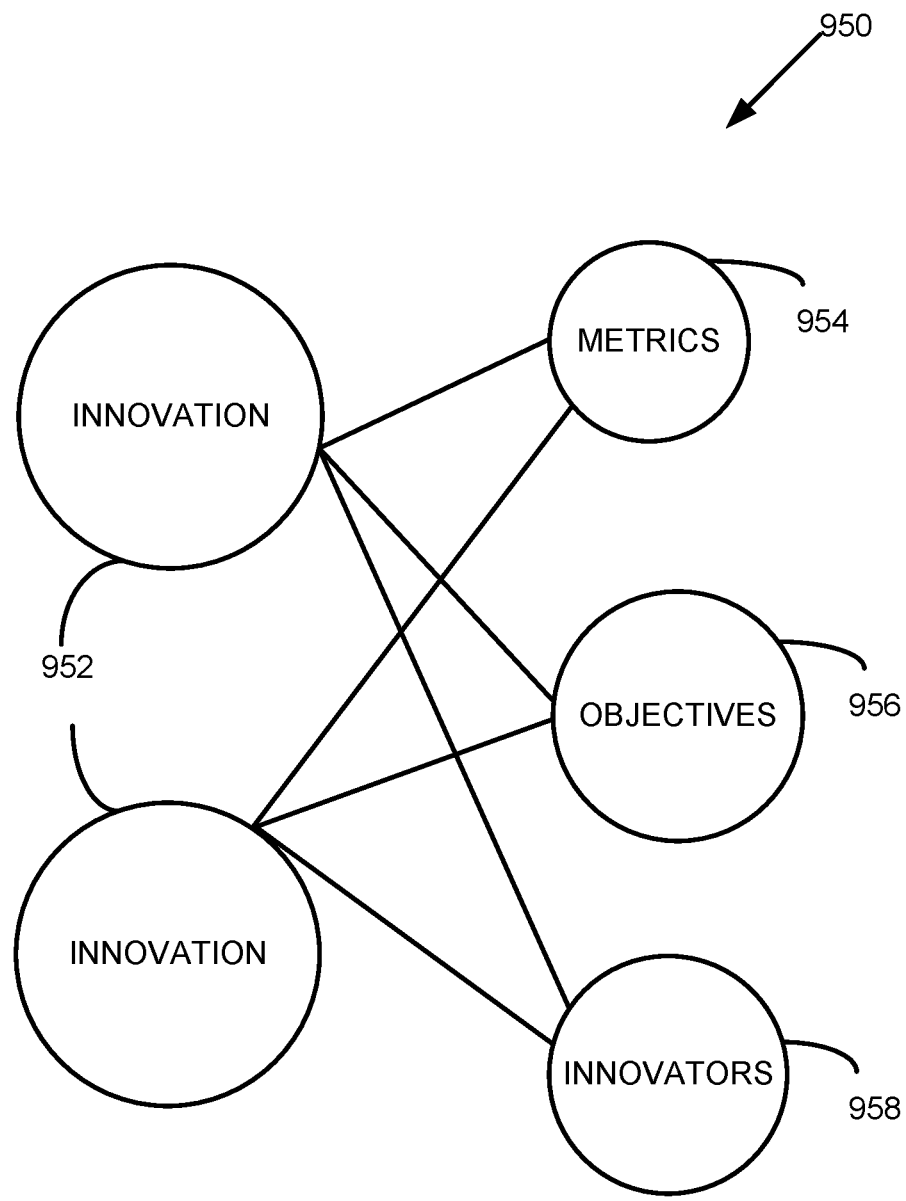
FIG. 9B shows a generalized diagram of a knowledge graph that can be built in accordance with the examples disclosed herein.

FIG. 9B shows a generalized diagram of a knowledge graph 950 that can be built in accordance with the examples disclosed herein. The knowledge graph 950 can encode entities related to a specific category. Similar knowledge graphs can be built for different categories for which the innovations are researched and identified by the innovation data processing system 100. The links obtained from the information material 152 by using tools such as the entity-relationship processor 106 which employ NLP can be encoded within structures such as the knowledge graph 950. The entities pertaining to innovations 952 are connected to other entities such as metrics 954 pertaining to the innovations, the category-based objectives 956 of the innovations, the innovators 958 (i.e., the persons or organizations associated with the innovations), etc.

Figure 10:
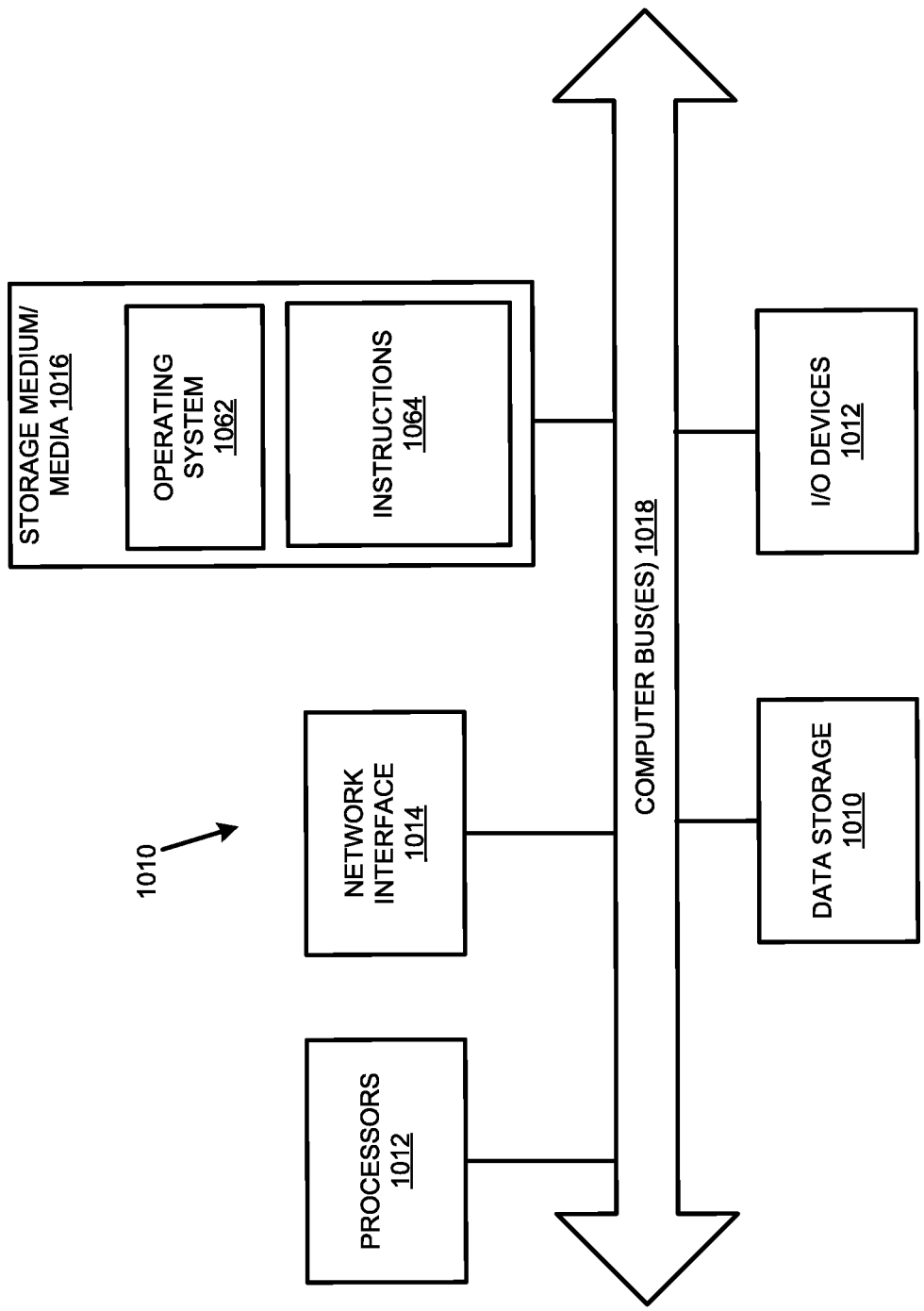
FIG. 10 illustrates a computer system that may be used to implement the AI-based innovation data processing system in accordance with the examples disclosed herein.

FIG. 10 illustrates a computer system 1000 that may be used to implement the AI-based innovation data processing system 100. More particularly, computing machines such as desktops, laptops, smartphones, tablets and wearables which may be used to generate or access the data from the innovation data processing system 100 may have the structure of the computer system 1000. The computer system 1000 may include additional components not shown and that some of the process components described may be removed and/or modified. In another example, a computer system 1000 can sit on external-cloud platforms such as, Amazon Web Services, AZURE® cloud or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, s as a Local Area Network (LAN), a wireless 802.11x LAN, a 3G or 4G mobile WAN or a WiMax WAN, and a computer-readable (or processor-readable) storage medium 1006. Each of these components may be operatively coupled to a bus 1008. The computer-readable storage medium 1006 may be any suitable medium which participates in providing instructions to the processor(s) 1002 for execution. For example, the storage medium 1006 may be non-transitory or non-volatile medium, such as a magnetic disk or solid-state non-volatile memory or volatile medium such as RAM. The instructions or modules stored on the storage medium 1006 include machine-readable instructions 1064 executed by the processor(s) 1002 that cause the processor(s) 1002 to perform the methods and functions of the innovation data processing system 100.

The innovation data processing system 100 may be implemented as software stored on a non-transitory processor-readable medium and executed by the one or more processors 1002. For example, the storage medium 1006 may store an operating system 1052, such as MAC OS, MS WINDOWS, UNIX, or LINUX, and code 1064 for the innovation data processing system 100. The operating system 1052 may be multi-user, multiprocessing, multitasking, multithreading, real-time and the like. For example, during runtime, the operating system 1052 is running and the code for the innovation data processing system 100 is executed by the processor(s) 1002.

The computer system 1000 may include a data storage 1010, which may include non-volatile data storage. The data storage 1010 stores any data used by the innovation data processing system 100. The data storage 1010 may be used to store the information material, the various material selection criteria values, the predetermined confidence threshold, the selected material and the selected sentences, the knowledge graphs, the plots generated by the trend detector and the responses generated by the innovation data processing system 100.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based innovation data processing system comprising:
    at least one processor;
    a non-transitory processor-readable medium storing machine-readable instructions that cause the at least one processor to:
        receive at least one query word related to innovation identification within a category, wherein different stages of innovations can be identified within the category;
        search a plurality of data sources for documents of different types using the at least one query word as a search query;
        extract a plurality of the documents related to the at least one query word from at least one data source of the plurality of data sources, the plurality of documents including at least textual data related to the innovation identification within the category;
        associate each of the plurality of documents with one or more of the different stages of innovation based at least on a type of the document;
        identify entities in the textual data of the plurality of documents wherein the entities are associated with the innovation identification within the category;
        select portions of the plurality of documents that satisfy material selection criteria pertaining to the entities for further processing;
        generate, via dependency parsing, labeled syntactic dependencies between words in sentences of the portions of the plurality of documents;
        obtain, via providing the labeled syntactic dependencies to a trained classifier, identification of a subset of one or more of the entities corresponding to the innovation identification from the portions of the plurality of documents;
        generate a knowledge graph including the subset of one or more entities and relationships between the subset of one or more entities;
        determine trends in respective frequencies of occurrences of the subset of one or more entities in the portions of the plurality of documents over a specified time period;
        rank the subset of one or more entities based on the frequencies of the subset of one or more entities in the portions of the plurality of documents; and
        output the subset of one or more entities, using the knowledge graph and the rankings;
        identify, as an innovation within the category, at least one of the ranked subset of one or more entities that has a lower frequency of occurrences in an initial time period of the specified time period; and
        classify the innovation into one of the different stages of innovation based at least on the association of each of the plurality of documents with the one or more stages.

2. The innovation data processing system of claim 1, wherein the instructions for extracting the plurality of documents comprise further instructions that cause the processor to:
    extract the plurality of documents that meets at least two of four of the material selection criteria.

3. The innovation data processing system of claim 2, wherein the material selection criteria pertain to the documents including synonyms, usages, possible benefits and suppliers associated with the one or more entities.

4. The innovation data processing system of claim 2, wherein the material selection criteria pertain to selecting paragraphs in the documents and the instructions for selecting the portions of the plurality of documents comprise further instructions that cause the processor to:
    extract the paragraphs from the plurality of documents when the paragraphs include at least one of the material selection criteria.

5. The innovation data processing system of claim 4, wherein the material selection criteria pertain to selecting sentences in the paragraphs and the instructions for extracting the plurality of documents include further instructions that cause the processor to:
    extract the sentences in the paragraphs when the sentences include at least one of the material selection criteria.

6. The innovation data processing system of claim 1, wherein the instructions for generating the knowledge graph comprise further instructions that cause the processor to:
    select nouns from the subset of one or more entities based on an output of the dependency parsing.

7. The innovation data processing system of claim 1, wherein the instructions for obtaining the subset of one or more entities comprise further instructions that cause the processor to:
    train the classifier for identifying the subset of one or more entities based on a set of heuristic queries pertaining to the category.

8. The innovation data processing system of claim 1, comprising further instructions that cause the processor to:
    identify nodes from an output of the dependency parsing indicating category-based objectives that can be improved.

9. The innovation data processing system of claim 8, wherein instructions for identifying the nodes comprising further instructions that cause the processor to:
  identify the nodes from the output of the dependency parsing with words indicating potential directions of optimization of the objectives.

10. The innovation data processing system of claim 8, wherein instructions for identifying the nodes comprising further instructions that cause the processor to:
  identify phrases indicating qualitative and quantitative terms of the objectives from the output of the dependency parsing.

11. The innovation data processing system of claim 10, wherein the instructions for identifying the phrases comprise further instructions that cause the processor to:
  identify comparative adjectives with noun phrases as adverbial modifiers within the output of the dependency parsing.

12. An artificial intelligence (AI) based innovation identification method comprising:
  receiving at least one query word related to a category pertaining to an innovation identification process, wherein different stages of innovations can be identified within the category;
  search a plurality of data sources for documents of different types using the at least one query word as a search query;
  extract a plurality of documents related to the at least one query word from the plurality of data sources, the plurality of documents including at least textual data related to one or more innovations, benefits of the innovations and suppliers of the innovations;
  associating each of the plurality of documents with one or more of the different stages based at least on a type of the document;
  identifying entities from the textual data of the plurality of documents wherein the entities are associated with the innovation identification within the category;
  selecting at least portions of the plurality of documents based on material selection criteria pertaining to the entities for further processing;
  generating, via dependency parsing, labeled syntactic dependencies between words in the portions of the plurality of documents;
  obtaining, via providing the labeled syntactic dependencies to a trained classifier, a subset of one or more of the entities corresponding to the innovations from the portions of the plurality of documents;
  generating one or more knowledge graphs including the subset of one or more entities and relationships between the subset of one or more entities;
  determining trends in respective frequencies of occurrences of the subset of one or more entities pertaining to the innovations in the portions of the plurality of documents over a specified time period;
  ranking the subset of one or more entities based on the frequencies of the subset of one or more entities in the portions of the plurality of documents;
  identifying as an innovation within the category, at least one of the ranked subset of one or more entities that has a lower frequency of occurrences in an initial time period of the specified time period; and
  classify the innovation into one of the different stages of innovation based at least on the association of each of the plurality of documents with the one or more stages.

13. The innovation identification method of claim 12, further comprising:
  receiving, via a chat bot interface, a query from a user regarding the innovations.

14. The innovation identification method of claim 13, further comprising:
  enabling display of a response in a user interface associated with the chat bot.

15. The innovation identification method of claim 12, further comprising:
  determining that the response includes temporal data obtained from the plurality of documents.

16. The innovation identification method of claim 12, further comprising:
  producing a report including the ranking of the innovations via a reporting interface.

17. The innovation identification method of claim 12, wherein obtaining, via a trained classifier, identification of the subset of one or more entities corresponding to the innovations, further comprises:
  generating a respective confidence level for each sentence in the textual data, the respective confidence level indicative of presence of the subset of one or more entities pertaining to the innovations in the sentence;
  comparing the respective confidence level with a predetermined threshold confidence level; and
  determining that the sentence includes at least one entity of the subset of one or more entities pertaining to the innovations based on the comparison with the predetermined threshold confidence level.

18. A non-transitory processor-readable storage medium comprising machine-readable instructions that cause a processor to:
  receive at least one query word related to innovation identification within a category, wherein different stages of innovations can be identified within the category;
  search a plurality of data sources for documents of different types using the at least one query word as a search query;
  extract a plurality of the documents related to the at least one query word from at least one data source of the plurality of data sources, the plurality of documents including at least textual data related to the innovation identification within the category;
  associate each of the plurality of documents with one or more of the different stages of innovation based at least on a type of the document;
  identify entities in the textual data of the plurality of documents wherein the entities are associated with the innovation identification within the category;
  select portions of the plurality of documents that satisfy material selection criteria pertaining to the entities for further processing;
  generate, via dependency parsing, labeled syntactic dependencies between words in sentences of the selected portions of the plurality of documents;
  identify, via providing the labeled syntactic dependencies to a trained classifier, a subset of one or more of the entities corresponding to the innovation identification from the selected portions of the plurality of documents;
  generate a knowledge graph including the subset one or more entities and relationships between the subset one or more entities;
  determine trends in respective frequencies of occurrences of the subset of one or more entities in the portions of the plurality of documents over a specified time period;

rank the subset of one or more entities based on the frequencies of the subset of one or more entities in the portions of the plurality of documents; and output the subset of one or more entities, using the knowledge graph and the rankings;

identify as an innovation within the category, at least one of the ranked subset of one or more entities that has a lower frequency of occurrences in an initial time period of the specified time period; and classify the innovation into one of the different stages of innovation based at least on the association of each of the plurality of documents with the one or more stages.

19. The non-transitory processor-readable storage medium of claim 18, wherein the instructions for identifying the subset of one or more of the entities corresponding to the innovation identification further comprises instructions that cause the processor to:

generate a respective confidence level for each sentence in the textual data, the respective confidence level indicative of presence of the subset of one or more entities in the sentence.

20. The non-transitory processor-readable storage medium of claim 18, further comprising instructions that cause the processor to:

compare the respective confidence level with a predetermined threshold confidence level; and determine that the sentence includes the subset of one or more entities based on the comparison with the predetermined threshold confidence level.

\* \* \* \* \*